US009448863B2

(12) United States Patent
Supalov et al.

(10) Patent No.: US 9,448,863 B2
(45) Date of Patent: Sep. 20, 2016

(54) MESSAGE PASSING INTERFACE TUNING USING COLLECTIVE OPERATION MODELING

(75) Inventors: Alexander Valerievich Supalov, Tuntenhausen (DE); Michael Vyacheslavovich Chuvelev, Sarov (RU); Dmitriy Vitalievich Dontsov, Sarov (RU); Vladimir Dmitrievich Truschin, Sarov (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,681

(22) PCT Filed: Nov. 8, 2011

(86) PCT No.: PCT/RU2011/000867
§ 371 (c)(1),
(2), (4) Date: Nov. 25, 2013

(87) PCT Pub. No.: WO2013/070106
PCT Pub. Date: May 16, 2013

(65) Prior Publication Data
US 2014/0075452 A1   Mar. 13, 2014

(51) Int. Cl.
*G06F 9/54* (2006.01)
*G06F 9/46* (2006.01)
(Continued)

(52) U.S. Cl.
CPC ............. *G06F 9/546* (2013.01); *G06F 9/5066* (2013.01); *G06F 11/3457* (2013.01); *G06F 2201/865* (2013.01)

(58) Field of Classification Search
None
See application file for complete search history.

(56) References Cited

U.S. PATENT DOCUMENTS 7,769,856 B2   8/2010  Supalov et al.
8,739,139 B2 * 5/2014  Miyoshi ................ G06F 9/4426
                                                          717/140
(Continued)

FOREIGN PATENT DOCUMENTS

WO   2013070106 A1   5/2013

OTHER PUBLICATIONS

Chaarawi et al., "A Tool for Optimizing Runtime Parameters of Open MPI," Proceedings of the 15th European PVM/MPI Users' Group Meeting on Recent Advances in Parallel Virtual Machine and Message Passing Interface, 2008, pp. 210-217.
Vadhiyar et al., "Automatically Tuned Collective Communications," Supercomputing '00 Proceedings of the 2000 ACM/IEEE Conference on Supercomputing, 2000, 11 pages.
(Continued)

*Primary Examiner* — H S Sough
*Assistant Examiner* — Kimberly Jordan
(74) *Attorney, Agent, or Firm* — Barnes & Thornburg LLP

(57) ABSTRACT

Illustrative embodiments of methods, machine-readable media, and parallel computing systems that automatically tune a communication protocol are disclosed. In some embodiments, a method may include selecting a collective operation to be implemented by a Message Passing Interface (MPI) of a parallel computing system, wherein the MPI is configured to implement the collective operation using at least one of a plurality of algorithms; modeling each of the plurality of algorithms as a corresponding plurality of point-to-point operations; determining a transfer rate of each of the plurality of algorithms using its corresponding plurality of point-to-point operations; selecting one or more algorithms from among the plurality of algorithms, the one or more selected algorithms having higher transfer rates than one or more non-selected algorithms; and testing performance of the one or more selected algorithms with a plurality of configuration parameters to determine at least one optimized algorithm for implementing the collective operation.

24 Claims, 4 Drawing Sheets

(51) Int. Cl.
*G06F 9/50* (2006.01)
*G06F 11/34* (2006.01)

(56) References Cited

U.S. PATENT DOCUMENTS

| | | | |
|---|---|---|---|
| 8,789,067 B2* | 7/2014 | Davis | G06F 15/17318 709/224 |
| 9,189,447 B2* | 11/2015 | Faraj | G06F 15/17318 |
| 2012/0185873 A1* | 7/2012 | Archer | G06F 9/546 719/313 |

OTHER PUBLICATIONS

International Search Report and Written Opinion received for PCT/RU2011/000867, mailed Aug. 6, 2012, 13 pages.

Mamadou et al., "A Robust Dynamic Optimization for MPI Alltoall Operation," IPDPS'09 Proceedings of IEEE International Symposium on Parallel & Distributed Processing, 2009, 13 pages.

Pješivac-Grbović et al., "Performance Analysis of MPI Collective Operations," Cluster Computing, vol. 10, Issue 2, Mar. 15, 2007, pp. 127-143.

\* cited by examiner

MESSAGE PASSING INTERFACE TUNING USING COLLECTIVE OPERATION MODELING

BACKGROUND

Parallel computing systems comprise a plurality of nodes. For instance, a parallel computing system may include a plurality of processors and/or a plurality of processor cores. Each node of a parallel computing system is capable of performing data computation independently of the other nodes of the parallel computing system. Applications written for parallel computing systems exploit this parallelism by distributing their workload across multiple nodes. Each node of a parallel computing system may independently execute one or more processes (each process being part of a larger application run on the parallel computing system). In such parallel computing systems, processes communicate with other processes to share data. A parallel computing system typically uses a communication protocol to implement this sharing of data.

A Message Passing Interface (MPI) is a language-independent communication protocol used by many parallel computing systems. An MPI may be implemented in any number of programming languages. An MPI provides virtual topology, synchronization, and communication functionality between a set of processes. Among other operations, an MPI typically supports both point-to-point and collective communications between processes. Point-to-point operations involve the communication of data between two processes. Collective operations involve the communication of data among all processes in a process group (which may include all, or an application-defined subset of, the processes running on the parallel computing system).

To increase performance, the parameters of a communication protocol, such as an MPI, may be tuned for a particular application and/or a particular parallel computing system. Manual testing and selection of these configuration parameters often requires many hours of tedious tuning work. This tuning work must be repeated for every unique application run on the parallel computing system. Any change to an application or the composition of the parallel computing system (e.g., the number of nodes) may also require re-tuning of the configuration parameters of the communication protocol.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
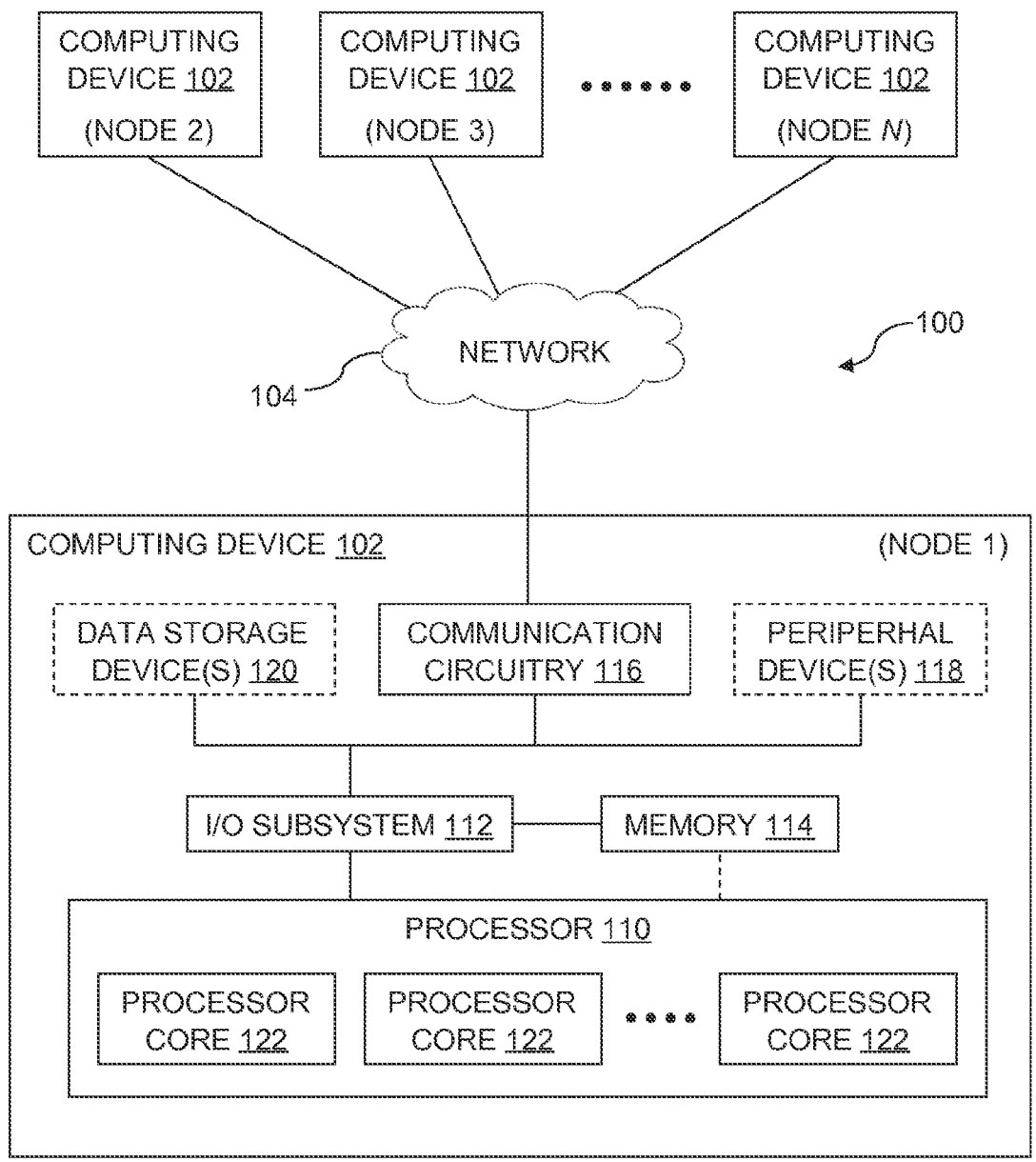
FIG. 1 is a simplified block diagram of at least one embodiment of a parallel computing system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an illustrative embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments, whether or not explicitly described.

Embodiments of the invention may be implemented in hardware, firmware, software, or any combination thereof. Embodiments of the invention implemented in a parallel computing system may include one or more bus-based interconnects between components and/or one or more point-to-point interconnects between components. Embodiments of the invention may also be implemented as a plurality of instructions stored on one or more non-transitory, machine-readable media, which may be read and executed by one or more processors. A machine-readable medium may include any mechanism for storing or transmitting information in a form readable by a machine (e.g., a computing device). For example, a machine-readable medium may include any one or combination of read only memory (ROM), random access memory (RAM), magnetic disk storage media, optical storage media, flash memory devices, and others.

The present disclosure generally relates to methods and systems for automatically tuning the configuration parameters of a communication protocol used in a parallel computing system, such as the parallel computing system 100 illustrated in FIG. 1, by way of example. According to the present disclosure, a parallel computing system may include a module (which may be embodied as hardware, firmware, software, or any combination thereof) that automatically tunes the configuration parameters of a communication protocol, such as a Message Passing Interface (MPI). For instance, in the illustrative embodiments shown in FIGS. 2 and 3, a tuning module 212 may automatically tune the configuration parameters of an MPI 208 of the parallel computing system 100. As such, the tuning module 212 may optimize the MPI 208 to execute a particular application on the parallel computing system 100. When using the term "optimize" (or variants thereof), the present disclosure contemplates the determination of settings for the MPI 208 that result in improved performance as compared to some other group of settings.

While such automatic tuning provides substantial benefits, the tuning process can still take significant amounts of time, as the tuning module must generally test every possible combination of configuration parameters that may be used with a communication protocol in order to determine the set of configuration parameters that give optimal performance for a particular application on a particular parallel computing system. Most prominently, the collective operations of an MPI, which typically account for a substantial proportion of the total MPI execution time in many high performance computing applications, often require considerable tuning time due to the numerous algorithms that may be used to implement each collective operation. According to the present disclosure, the speed of the automatic tuning process may be increased through modeling of an MPI's collective operations using point-to-point operations. Using these models, comparatively slow algorithms for implementing a collective operation in particular circumstances may be disregarded and, hence, the solution space to be searched during the automatic tuning process may be reduced. One illustrative embodiment for automatically tuning an MPI using such collective operation modeling is shown in the simplified flow diagram of FIG. 4 and will be further discussed below.

Referring now to FIG. 1, one illustrative embodiment of a parallel computing system 100 that may utilize the automatic tuning process of the present disclosure is shown as a simplified block diagram. The illustrative parallel computing system 100 includes a plurality of computing devices 102 and a network 104 that communicatively couples the plurality of computing devices 102. As shown in FIG. 1, each of the plurality of computing devices 102 comprises a node of the parallel computing system 100. It will be appreciated by those of ordinary skill in the art that the parallel computing system 100 may comprise any number of computing devices 102 (and, thus, any number of nodes). Although the components of only one computing device 102 are illustrated in FIG. 1, it is contemplated that each of the plurality of computing devices 102 may include similar components. It is also contemplated that any one of the plurality of computing devices 102 may include additional or fewer components than those shown in FIG. 1.

Each of the plurality of computing devices 102 may be embodied as any type of electronic device capable of performing the functions described herein. By way of example, each computing device 102 may be embodied as a personal computer, a workstation, a laptop computer, a handheld computer, a mobile internet device, a cellular phone, a personal data assistant, a telephony device, a network appliance, a virtualization device, a storage controller, or other computer-based device. In the illustrative embodiment shown in FIG. 1, each computing device 102 includes a processor 110, an I/O subsystem 112, a system memory 114, and communication circuitry 116. Each computing device 102 also optionally includes one or more peripheral devices 118 and one or more data storage devices 120. In some embodiments, several of the foregoing components may be incorporated on a motherboard of each computing device 102, while other components may be communicatively coupled to the motherboard via, for example, one or more peripheral ports. Furthermore, it should be appreciated that each computing device 102 may include other components, sub-components, and devices commonly found in a computer and/or computing device, which are not illustrated in FIG. 1 for clarity of the description.

The processor 110 of the computing device 102 may be any type of processor capable of executing software/firmware, such as a microprocessor, digital signal processor, microcontroller, or the like. The processor 110 is illustratively embodied as a multi-core processor having multiple processor cores 122. However, in other embodiments, the processor 110 may be embodied as a single core processor having a single processor core 122. As such, it is contemplated that the processor 110 may have any number of processor cores 122. Additionally, each computing device 102 may include additional processors 110 having one or more processor cores 122. In the illustrative embodiment, each processor core 122 of each computing device 102 is capable of performing data computation independently of the other processor cores 122, providing further parallelism to the parallel computing system 100. The processor cores 122 of each computing device 102 may be interconnected using any combination buses, crossbar switches, on-chip mesh networks, or the like.

The processor 110 is communicatively coupled to the I/O subsystem 112 via a number of signal paths. These signal paths (and other signal paths illustrated in FIG. 1) may be embodied as any type of signal paths capable of facilitating communication between the components of each computing device 102. For example, the signal paths may be embodied as any number of wires, cables, light guides, printed circuit board traces, via, bus, intervening devices, and/or the like. The I/O subsystem 112 of each computing device 102 may be embodied as circuitry and/or components to facilitate input/output operations with the processor 110 and/or other components of the computing device 102. In some embodiments, the I/O subsystem 112 may be embodied as a memory controller hub (MCH or "northbridge"), an input/output controller hub (ICH or "southbridge"), and a firmware device. In other embodiments, I/O subsystems having other configurations may be used. For example, in some embodiments, the I/O subsystem 112 may be embodied as a platform controller hub (PCH). In such embodiments, the memory controller hub (MCH) may be incorporated in or otherwise associated with the processor 110, and the processor 110 may communicate directly with the system memory 114 (as shown by the hashed line in FIG. 1). In still other embodiments, the I/O subsystem 112 may form a portion of a system-on-a-chip (SoC) and be incorporated, along with the processor 110 and other components of the computing device 102, on a single integrated circuit chip.

The system memory 114 of each computing device 102 is also communicatively coupled to the I/O subsystem 112 via a number of signal paths. The system memory 114 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single system memory device 114 is illustrated in FIG. 1, in other embodiments, each computing device 102 may include additional system memory devices. In the illustrative embodiment of FIG. 1, each computing device 102 is embodied as a symmetric multiprocessor system in which each processor core 122 utilizes the system memory 114 as a shared memory. As such, the plurality of computing device 102 of the parallel computing system 100 are illustratively embodied as a symmetric multiprocessor cluster.

The communication circuitry 116 of each computing device 102 may be embodied as any number of devices and circuitry for enabling communications between the plurality of computing devices 102 over the network 104. The network 104 may be embodied as any type of wired and/or wireless network such as a local area network, a wide area network, a publicly available global network (e.g., the Internet), and/or other network. The network 104 may include any number of additional devices to facilitate communication between the plurality of computing devices 102, such as routers, switches, intervening computers, and the like. Additionally or alternatively, the network 104 may employ a switched fabric topology, such as InfiniBand®, or Fibre Channel, by way of example. The communication circuitry 116 may include one or more wired and/or wireless network interfaces to facilitate communications over the wired and/or wireless portions of the network 104. Communication circuitry 116 is also communicatively coupled to the I/O subsystem 112 via a number of signal paths, allowing the processor 110 to access the network 104.

Each computing device 102 may also optionally include one or more peripheral devices 118 and one or more data storage devices 120. By way of illustrative example, the peripheral device(s) 118 may include a display, a mouse, a keyboard, and/or one or more external speakers. The particular peripheral device(s) 118 included in each computing device 102 may depend upon, for example, the intended use of that computing device 102. The data storage device(s) 120 may be illustratively embodied as any type of device configured for the short-term or long-term storage of data such as, for example, memory devices and circuits, memory cards, hard disk drives, solid-state drives, or other data storage devices. When present, the peripheral device(s) 118 and the data storage device(s) 120 are each communicatively coupled to the I/O subsystem 112 via a number of signal paths, allowing the I/O subsystem 112 and/or processor 110 to receive inputs from and send outputs to the peripheral device(s) 118 and/or to the data storage device(s) 120.

Figure 2:
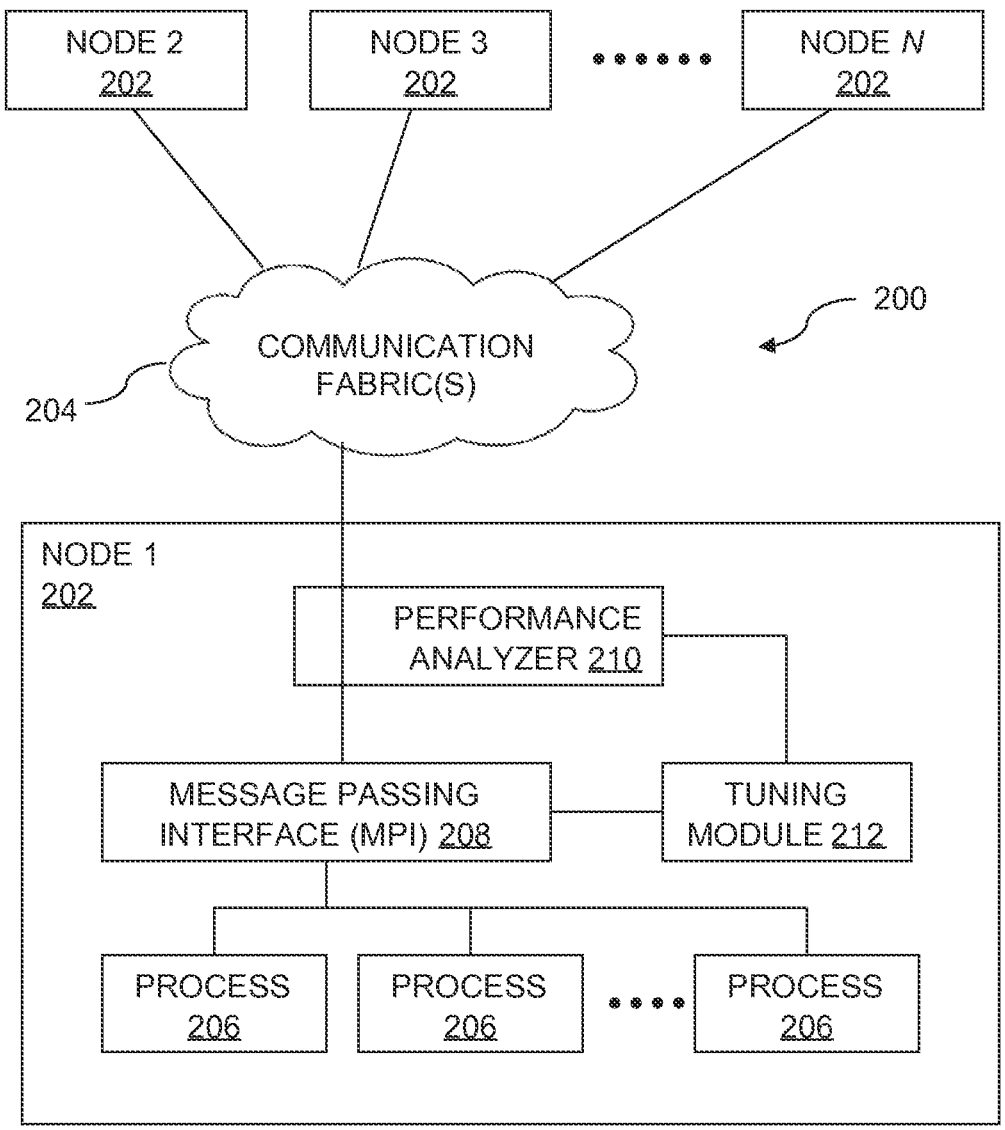
FIG. 2 is a simplified block diagram of at least one embodiment of a software environment of the parallel computing system of FIG. 1.

Referring now to FIG. 2, one illustrative embodiment of a software environment 200 of the parallel computing system 100 is shown as a simplified block diagram. As discussed above, the parallel computing system 100 comprises a plurality of nodes 202 communicatively coupled via one or more communication fabrics 204. The communication fabric(s) 204 may include any number and type of communications links, including those described above with reference to network 104. Once again, it will be appreciated by those of ordinary skill in the art that the parallel computing system 100 may comprise any number of nodes 202. Although only one node 202 is illustrated in detail in the software environment 200 of FIG. 2, it is contemplated that each of the plurality of nodes 202 may include similar components. It is also contemplated that any node 202 may include additional or fewer components than those shown in FIG. 2.

Each node 202 of the parallel computing system 100 is capable of performing data computation independently of the other nodes 202. As such, each node 202 may be tasked with executing one or more processes 206. Each process 206 represents a portion of a larger application running on the parallel computing system 100 and may perform a fraction of the total application workload. In the illustrative embodiment of FIG. 2, where each node 202 represents a computing device 102 including a processor 110 having multiple processor cores 122, each node 202 may simultaneously execute a plurality of processes 206.

During execution each process 206 may require data from other processes 206, or may need to transmit its data to other processes 206. To implement this sharing of data, the parallel computing system 100 includes a Message Passing Interface (MPI) 208. It is contemplated that, in other embodiments, the parallel computing system 100 may utilize a different interface implementing another communication protocol. The MPI 208 may be illustratively embodied as a library, such as the Intel® MPI Library, available from Intel Corporation of Santa Clara, Calif., which employs specialized function calls to pass data between processes 206. For instance, the MPI 208 may include a plurality of point-to-point operations and a plurality of collective operations that may be called by the processes 206. In some embodiments, the library of MPI 208 may be linked into the application binary at compile time. In other embodiments, virtual machines and/or interpreters may be used as functional equivalents. The MPI 208 may also support a shared memory environment within and across the plurality of nodes 202.

In the illustrative embodiment of FIG. 2, the parallel computing system 100 includes a performance analyzer 210. The performance analyzer 210 may capture information relating to the MPI 208 (including, but not limited to, bandwidth and overhead parameters) and may pass this information to a tuning module 212. The performance analyzer 210 may be implemented as an extension to MPI 208 or as a separate compiled program. Additionally or alternatively, the performance analyzer 210 may be embedded in hardware and may be capable of physically interfacing with the parallel computing system 100.

The parallel computing system 100 also includes a tuning module 212. The tuning module 212 is configured to receive inputs from the MPI 208, as well as the performance analyzer 210, to perform necessary calculations and/or simulations, and to output optimized configuration parameters for the MPI 208. The tuning module 212 may reside on a single node 202 of the parallel computing system 100 (e.g., a server), or may distribute its functions across multiple nodes 202. As such, the tuning module 212 may be illustratively embodied as a software program executed on the processor(s) 110 of one or more computing devices 102 of the parallel computing system 100. Additionally or alternatively, the tuning module 212 may comprise one or more dedicated hardware devices located at one or more nodes 202 and/or a standalone device capable of interfacing with one or more communication fabrics 204. The operations of the tuning module 212 will be further described below with reference to FIGS. 3 and 4.

Figure 3:
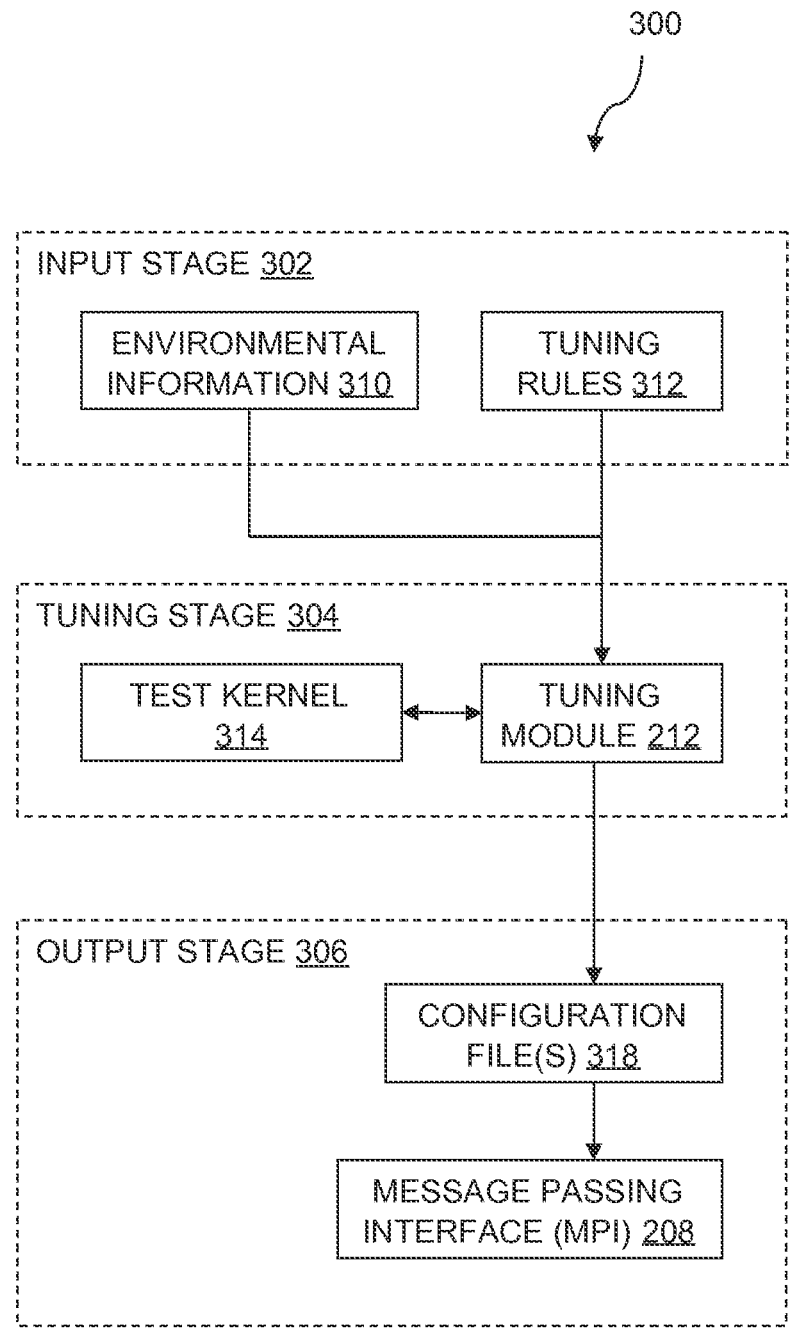
FIG. 3 is a simplified block diagram of at least one embodiment of a software environment for automatically tuning a communication protocol of the parallel computing system of FIG. 1.

A simplified block diagram of one illustrative embodiment of a software environment 300 allowing the tuning module 212 to automatically tune the configuration parameters of the MPI 208 is shown in FIG. 3. As illustrated in FIG. 3, the automatic tuning process comprises three stages 302-306. During an input stage 302, environmental information 310 and tuning rules 312 may be collected and provided as inputs to the tuning module 212. During a tuning stage 304, the tuning module 212 may utilize these inputs and interface with a test kernel 314 to analyze a plurality of configuration parameters for the MPI 208. During an output stage 306, the tuning module 212 may provide optimized configuration parameters to one or more configuration files 318 for use by the MPI 208.

The environmental information 310 and the tuning rules 312 collected during the input stage 302 provide constraints to the tuning module 212 during the automatic tuning process. The environmental information 310 may include data representing features of the parallel computing system 100. In some embodiments, the environmental information 310 may include data relating to the number of nodes 202 in the parallel computing system 100, the number of processors 110 and/or processor cores 122 per node 202, the available communication fabric(s) 204, operating system information, and the like. The environmental information 310 may be captured automatically using standard hardware and software detection techniques, or may be specified beforehand in a manually created file.

The tuning rules 312 may specify one or more configuration parameters of the MPI 208 to be optimized. In some embodiments, the tuning rules 312 may further specify an order of priority for optimizing the one or more configuration parameters. These configuration parameters may influence, by way of example, the bandwidth and/or the latency of one or more operations of the MPI 208. Illustrative configuration parameters may include Boolean variables, numerical variables (e.g., packet size), and enumerable variables (e.g., indexed lists of available communication fabrics 204 and of algorithms that the MPI 208 may use to implement a particular operation). In addition to the one or more configuration parameters to be optimized, the tuning rules 312 may also include heuristics. For instance, the tuning rules 312 may include a process placement heuristic or a process pinning heuristic requiring that a specific process 206 not be spread across multiple nodes 202 or be restricted to a particular node 202. In some embodiments, some or all of the tuning rules 312 may be user-specified. Additionally or alternatively, some or all of the tuning rules 312 may be automatically selected from predefined profiles in response to the environmental information 310 and/or application information.

After receiving the environmental information 310 and the tuning rules 312, the tuning module 212 may analyze a plurality of configuration parameters for the MPI 208 during the tuning stage 304. Among other operations, the tuning module 212 may interface with the test kernel 314 to run simulations using a plurality of configurations parameters to determine the set of configuration parameters that gives optimal performance for a particular application on the parallel computing system 100. In some embodiments, the test kernel 314 may be a relatively small program designed to simulate a larger application for which the MPI 208 is to be optimized. In other embodiments, the test kernel 314 may be the application itself. In still other embodiments, the test kernel 314 may be a standard communication pattern (i.e., a benchmark) used to test communication protocols.

The tuning module 212 may determine optimal settings for some configuration parameters by running simulations on the test kernel 314 using every possible combination of a plurality of configuration parameters. During each simulation, the tuning module 212 may receive measurements of bandwidth, latency, and/or other characteristics of the MPI 208 from the performance analyzer 210. The tuning module 212 may then determine the optimal configuration parameters for the MPI 208 by comparing all of the measurements received from the performance analyzer 210. As noted above, however, tuning the collective operations of the MPI 208 using this "brute force" approach is inefficient due to the numerous algorithms that may be used to implement each collective operation. According to the present disclosure, the tuning module 212 may instead utilize a method 400 that models the collective operations using point-to-point operations (described in more detail below with reference to FIG. 4) to more efficiently tune the collective operations of the MPI 208.

After the tuning process is complete, the tuning module 212 may store one or more optimized configuration parameters in one or more configuration files 318 during the output stage 306. The configuration parameters stored in the configuration file(s) 318 may be referenced by the MPI 208 when implementing operations called by the processes 206. Additionally or alternatively, the configuration parameters stored in the configuration file(s) 318 may be arguments for instructions sent to hardware of the parallel computing system 100. In some embodiments, the tuning module 212 may pass the one or more optimized configuration parameters directly to the MPI 208 for use with an application (avoiding the use of the configuration file(s) 318). Although the foregoing tuning process has generally been described as being performed before the execution of the application, it is also contemplated that the tuning module 212 may perform the tuning process while the application is being executed by the parallel computing system 100. Such dynamic tuning may accommodate applications that run under a variety of communication protocol usage conditions.

Figure 4:
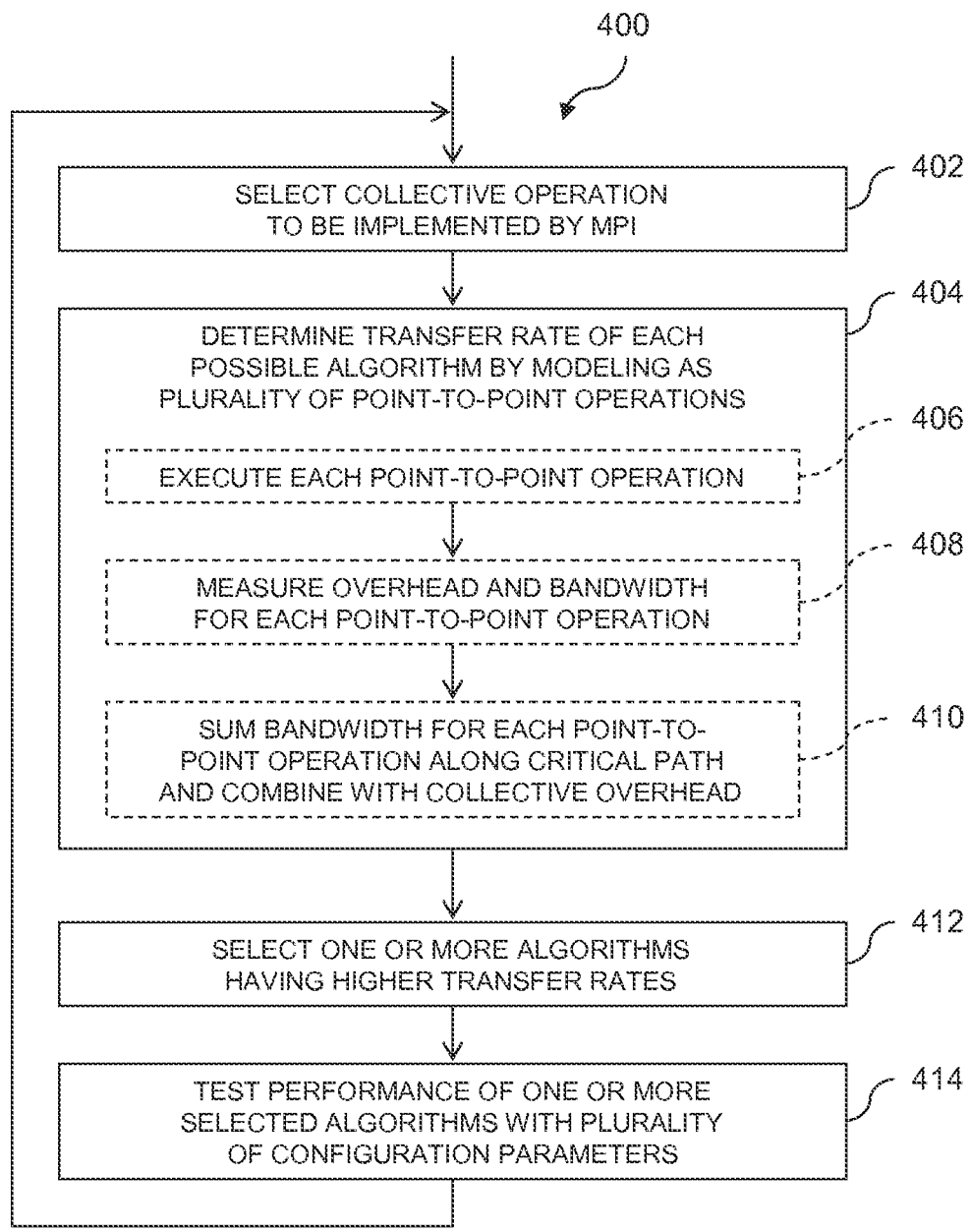
FIG. 4 is a simplified flow diagram of at least one embodiment of a method for automatically tuning the communication protocol of the parallel computing system of FIG. 1.

Referring now to FIG. 4, an illustrative embodiment of a method 400 for automatically tuning the MPI 208 of the parallel computing system 100 is shown as a simplified flow diagram. The method 400 may be executed by the tuning module 212 (in conjunction with the MPI 208 and/or the test kernel 314) to determine at least one optimized algorithm for implementing a collective operation with the MPI 208. The method 400 is illustrated as a number of blocks 402-414 in FIG. 4. Blocks 406-410 may be used to perform the operation of block 404 in some embodiments and are, therefore, indicated in phantom in FIG. 4.

The method 400 begins with block 402 in which the tuning module 212 selects a collective operation to be implemented by the MPI 208 of the parallel computing system 100. For instance, in block 402, the tuning module 212 may select a broadcast operation of the MPI 208. As another example, the tuning module 212 may select an all-reduce operation of the MPI 208 in block 402. It will be appreciated that many other collective operations may be selected by the tuning module 212 for optimization using the method 400. In some embodiments, the tuning module 212 may be configured to iteratively perform the method 400 for each of the plurality of collective operations to be implemented by the MPI 208.

As noted above, the MPI 208 may typically implement each collective operation using a plurality of different algorithms. For instance, the MPI 208 may implement the broadcast operation using a binomial tree algorithm, a recursive doubling algorithm, a ring algorithm, a Shumilin's ring algorithm, or similar algorithms. Likewise, the MPI 208 may implement the all-reduce operation using a Rabenseifner's algorithm, a binomial tree algorithm, a recursive doubling algorithm, a ring algorithm, a Shumilin's ring algorithm, or similar algorithms. The optimal algorithm for implementing a collective operation will often depend on features of the parallel computing system 100, such as the number of nodes 202, the number of processors 110 and/or processor cores 122 per node 202, the available communication fabric(s) 204, and the like (i.e., environmental information 310).

Moreover, the optimal algorithm for implementing a collective operation may also vary with the message size (i.e., message length) to be handled by the collective operation. Thus, for a particular parallel computing system 100, optimal performance for a collective operation may be achieved using a piecewise function, such as:

collective operation={$alg_0$@m≤$m_1$;$alg_1$@$m_1$≤ m=$m_2$; . . . ;$alg_n$@$m_n$<m}, where [$alg_1$, $alg_2$, . . . $alg_n$] represent different algorithms for implementing the collective operation, m represents the message size, and [$m_1$, $m_2$, . . . , $m_n$] represent message sizes that define the subdomains of the piecewise function. In other words, the piecewise function above specifies an optimized algorithm to be used by the MPI 208 for each message size to be handled by the collective operation. Thus, in some embodiments of the method 400, the tuning module 212 may determine multiple optimized algorithms for implementing the collective operation.

After block 402, the method 400 proceeds to block 404 in which the tuning module 212 determines a transfer rate of each of the plurality of algorithms that the MPI 208 could use to implement the collective operation selected in block 402. The transfer rate of each possible algorithm represents the time required for the algorithm to complete the collective operation. As will be further discussed below, determining a transfer rate for each possible algorithm allows the tuning module 212 to disregard comparatively slow algorithms (i.e., those with lower transfer rates) before performing more time-intensive simulations for the remaining algorithms. In block 404, the tuning module 212 determines a transfer rate of each of the plurality of algorithms by modeling each algorithm as a corresponding plurality of point-to-point operations. In other words, the tuning module 212 represents each possible algorithm as a predetermined sequence of point-to-point operations and measures performance characteristics of those point-to-point operations on the parallel computing system 100. In the illustrative embodiment, the tuning module 212 models each of the plurality of algorithms as a corresponding plurality of bi-directional send-receive (SendRecv) operations. It is contemplated that, in other embodiments, other point-to-point operations may be used to model each of the algorithms that the MPI 208 could use to implement the collective operation.

In some embodiments of the method 400, the tuning module 212 may determine the transfer rate of each of the plurality of algorithms by performing the operations set forth in blocks 406-410, as illustrated in FIG. 4. In such embodiments, the method 400 proceeds to block 406 in which the tuning module 212 causes the MPI 208 to execute each point-to-point operation included in the models of the possible algorithms. During block 406, each point-to-point operation is executed for each message size to be handled by the collective operation. In some embodiments of block 406, the tuning module 212 may cause the MPI 208 to execute point-to-point operations between processes 206 located at various distances, D, from one another, including: processes 206 located on the same socket (D=0), processes 206 located on different sockets of the same node 202 (D=1), and processes 206 located on different nodes 202 (D=2). In some embodiments of block 406, the tuning module 212 may also cause the MPI 208 to execute point-to-point operations for each possible process density, d (i.e. the number of processes 206 executing on each node 202 of the parallel computing system 100).

The method 400 may also include block 408 in which the performance analyzer 210 measures the time required to complete each point-to-point operation executed in block 408. The performance analyzer 210 sends measured data to the tuning module 212. In block 408, the tuning module 212 uses this measured data to determine a point-to-point overhead parameter and a bandwidth parameter for each executed point-to-point operation. In embodiments where the point-to-point operations executed in block 406 are over various distances, for various message sizes, and for various process densities, the tuning module 212 may approximate the time, t, required to complete each point-to-point operation using a piecewise linear function with the general form:

$$t(D, m, d) = \{$$
$$o_1 + m/b_1 \ @ \ D = 0, d = 1, m \le m_1 ;$$
$$o_2 + m/b_2 \ @ \ D = 0, d = 1, m > m_1 ;$$
$$o_3 + m/b_3 \ @ \ D = 0, d = 2 ;$$
$$...$$
$$\},$$

where D represents the distance between communicating processes 206, m represents the message size, d represents the processes 206 per node 202, o represents the point-to-point overhead parameter, and b represents the bandwidth parameter. This piecewise linear function specifies a point-to-point overhead parameter ($o_n$) and a bandwidth parameter ($m/b_n$) for each executed point-to-point operation.

After block 406 and block 408, the method 400 may proceed to block 410 in which the tuning module 212 calculates a transfer rate of each of the plurality of algorithms that the MPI 208 could use to implement the collective operation selected in block 402. For each possible algorithm, the tuning module 212 determines a critical path of the plurality of point-to-point operations used to model the algorithm. The "critical path" is the series of point-to-point operations that takes the longest to complete. In block 410, the tuning module 212 sums the bandwidth parameters for each point-to-point operation along the critical path in the model for each possible algorithm. The summed bandwidth parameters for each possible algorithm are one part of the transfer time for that algorithm.

In block 410, the tuning module 212 also calculates a collective overhead parameter for each possible algorithm. In some embodiments, the tuning module 212 may calculate the collective overhead parameter by determining a maximum point-to-point overhead parameter along the critical path and multiplying that maximum by an algorithm-specific coefficient. For a ring algorithm or a Shumilin's ring algorithm, the algorithm-specific coefficient may be N or N−1, where N represents the number of nodes 202 in the parallel computing system 100. For a Rabenseifner's algorithm, a recursive doubling algorithm, or a binomial tree algorithm, the algorithm-specific coefficient may be $\log_2(N)$, where N represents the number of nodes 202 in the parallel computing system 100. The tuning module 212 concludes block 410 by combining the collective overhead parameter for each possible algorithm with the summed bandwidth parameters for that algorithm to arrive at the transfer rate of the algorithm.

After block 404 (and blocks 406-410, in some embodiments), the method 400 proceeds to block 412 in which the tuning module 212 compares the transfer rates determined for each of the plurality of algorithms. Algorithms with lower transfer rates (i.e., those that are relatively inefficient) may be eliminated from further consideration by the tuning module 212. In block 412, the tuning module 212 will select one or more algorithms with relatively high transfer rates (i.e., having higher transfer rates than one or more non-selected algorithms) for further testing. Block 412 thus reduces the number of algorithms to be tested using the more time-intensive simulations of block 414.

After block 412, the method 400 proceeds to block 414 in which the tuning module 212 tests the performance of each algorithm selected in block 412 with a plurality of configuration parameters to determine at least one optimized algorithm for implementing the collective operation. To do so, the tuning module 212 may interface with the test kernel 314 to run simulations using a plurality of configurations parameters. In some embodiments of block 412, the tuning module 212 may test the performance of each selected algorithm by performing the automatic tuning process described above with reference to FIG. 3. For instance, the tuning module 212 may execute each of the selected algorithms with each possible combination of the plurality of configuration parameters on the test kernel 314.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
    selecting a collective operation to be implemented by a Message Passing Interface (MPI) of a parallel computing system, wherein the MPI is configured to implement the collective operation using at least one of a plurality of algorithms;
    modeling each of the plurality of algorithms as a corresponding plurality of point-to-point operations;
    determining a transfer rate of each of the plurality of algorithms by executing each point-to-point operation of the corresponding pluralities of point-to-point operations for each message size of a plurality of message sizes to be handled by the collective operation;
    selecting one or more algorithms from among the plurality of algorithms, the one or more selected algorithms having higher transfer rates for the plurality of message sizes than one or more non-selected algorithms; and
    testing performance of the one or more selected algorithms with a plurality of different values for at least one of a plurality of configuration parameters for the one or more selected algorithms to determine at least one optimized algorithm for implementing the collective operation.

2. The method of claim 1, wherein determining the transfer rate of each of the plurality of algorithms comprises:
    measuring a point-to-point overhead parameter and a bandwidth parameter for each executed point-to-point operation.

3. The method of claim 2, wherein executing each point-to-point operation of the corresponding pluralities of point-to-point operations comprises:
    executing at least one point-to-point operation between processes located on a single socket of the parallel computing system;
    executing at least one point-to-point operation between processes located on different sockets of a single node of the parallel computing system; and
    executing at least one point-to-point operation between processes located on different nodes of the parallel computing system.

4. The method of claim 3, wherein executing each point-to-point operation of the corresponding pluralities of point-to-point operations further comprises executing each point-to-point operation for each possible process density of the parallel computing system.

5. The method of claim 2, wherein determining the transfer rate of each of the plurality of algorithms further comprises summing the bandwidth parameters for each point-to-point operation along a critical path of the corresponding plurality of point-to-point operations.

6. The method of claim 5, wherein determining the transfer rate of each of the plurality of algorithms further comprises combining a collective overhead parameter with the summed bandwidth parameters for each of the plurality of algorithms, wherein the collective overhead parameter comprises the maximum point-to-point overhead parameter for the point-to-point operations along the critical path and an algorithm-specific coefficient.

7. The method of claim 1, wherein testing performance of the one or more selected algorithms comprises executing each of the one or more selected algorithms with each possible combination of the plurality of configuration parameters on a test kernel.

8. The method of claim 1, further comprising determining a piecewise function for implementing the collective operation in response to testing performance of the one or more selected algorithms, the piecewise function specifying an optimized algorithm for each message size to be handled by the collective operation.

9. One or more non-transitory, machine-readable media comprising a plurality of instructions that, in response to being executed, cause a tuning module of parallel computing system to:
    select a collective operation to be implemented by a Message Passing Interface (MPI) of the parallel computing system, wherein the MPI is configured to implement the collective operation using at least one of a plurality of algorithms;
    determine a transfer rate of each of the plurality of algorithms by modeling each of the plurality of algorithms as a corresponding plurality of point-to-point operations for each message size of a plurality of message sizes;
    select one or more algorithms from among the plurality of algorithms, the one or more selected algorithms having higher transfer rates than one or more non-selected algorithms for the plurality of message sizes; and
    test performance of the one or more selected algorithms with a plurality of different values for at least one of a plurality of configuration parameters for the one or more selected algorithms to determine at least one optimized algorithm for implementing the collective operation.

10. The one or more non-transitory, machine-readable media of claim 9, wherein to determine the transfer rate of each of the plurality of algorithms comprises to:
    cause the MPI to execute each point-to-point operation of the corresponding pluralities of point-to-point operations for each message size to be handled by the collective operation; and measure a point-to-point overhead parameter and a bandwidth parameter for each executed point-to-point operation.

11. The one or more non-transitory, machine-readable media of claim 10, wherein the plurality of instructions result in the tuning module causing the MPI to:
execute at least one point-to-point operation between processes located on a single socket of the parallel computing system;
execute at least one point-to-point operation between processes located on different sockets of a single node of the parallel computing system; and
execute at least one point-to-point operation between processes located on different nodes of the parallel computing system.

12. The one or more non-transitory, machine-readable media of claim 11, wherein the plurality of instructions result in the tuning module causing the MPI to execute each point-to-point operation for each possible process density of the parallel computing system.

13. The one or more non-transitory, machine-readable media of claim 10, wherein to determine the transfer rate of each of the plurality of algorithms comprises to sum the bandwidth parameters for each point-to-point operation along a critical path of the corresponding plurality of point-to-point operations.

14. The one or more non-transitory, machine-readable media of claim 13, wherein to determine the transfer rate of each of the plurality of algorithms comprises to combine a collective overhead parameter with the summed bandwidth parameters for each of the plurality of algorithms, the collective overhead parameter comprising the maximum point-to-point overhead parameter for the point-to-point operations along the critical path and an algorithm-specific coefficient.

15. The one or more non-transitory, machine-readable media of claim 9, wherein to test performance of the one or more selected algorithms comprises to execute each of the one or more selected algorithms with each possible combination of the plurality of configuration parameters on a test kernel.

16. The one or more non-transitory, machine-readable media of claim 9, wherein the plurality of instructions further cause the tuning module to determine a piecewise function for implementing the collective operation in response to testing performance of the one or more selected algorithms, the piecewise function specifying an optimized algorithm for each message size to be handled by the collective operation.

17. A parallel computing system comprising: a plurality of nodes, each of the plurality of nodes configured to execute one or more processes;
a Message Passing Interface (MPI) configured to communicate data between processes using a plurality of point-to-point operations and a plurality of collective operations; and
a tuning module to (i) select one of the plurality of collective operations, wherein the MPI is configured to implement the selected collective operation using at least one of a plurality of algorithms, (ii) determine a transfer rate of each of the plurality of algorithms based on execution of each point-to-point operation of the corresponding pluralities of point-to-point operations for each message size of a plurality of message sizes to be handled by the collective operation, (iii) select one or more algorithms from among the plurality of algorithms, the one or more selected algorithms having higher transfer rates than one or more non-selected algorithms for the plurality of message sizes, and (iv) test performance of the one or more selected algorithms with a plurality of different values for at least one of a plurality of configuration parameters for the one or more selected algorithms to determine at least one optimized algorithm for the MPI to implement the collective operation.

18. The parallel computing system of claim 17, wherein the tuning module is to perform operations (i)-(iv) for each of the plurality of collective operations of the MPI.

19. The parallel computing system of claim 17, wherein to determine the transfer rate of each of the plurality of algorithms comprises to:
measure a point-to-point overhead parameter and a bandwidth parameter for each executed point-to-point operation.

20. The parallel computing system of claim 19, wherein the tuning module is further to cause the MPI to:
execute at least one point-to-point operation between processes located on a single socket of the parallel computing system;
execute at least one point-to-point operation between processes located on different sockets of one of the plurality of nodes; and
execute at least one point-to-point operation between processes located on different nodes of the one of the plurality of nodes.

21. The parallel computing system of claim 20, wherein the tuning module is to cause the MPI to execute each point-to-point operation for each possible process density of the parallel computing system.

22. The parallel computing system of claim 19, wherein to determine the transfer rate of each of the plurality of algorithms comprises to sum the bandwidth parameters for each point-to-point operation along a critical path of the corresponding plurality of point-to-point operations.

23. The parallel computing system of claim 22, wherein to determine the transfer rate of each of the plurality of algorithms comprises to combine a collective overhead parameter with the summed bandwidth parameters for each of the plurality of algorithms, the collective overhead parameter comprising the maximum point-to-point overhead parameter for the point-to-point operations along the critical path and an algorithm-specific coefficient.

24. The parallel computing system of claim 17, wherein at least one of the plurality of nodes comprises a symmetric multiprocessor system to execute a plurality of processes using a shared memory.

* * * * *